J. SWAN.
Sleeping Car.
No. 65,963
Patented June 18, 1867.
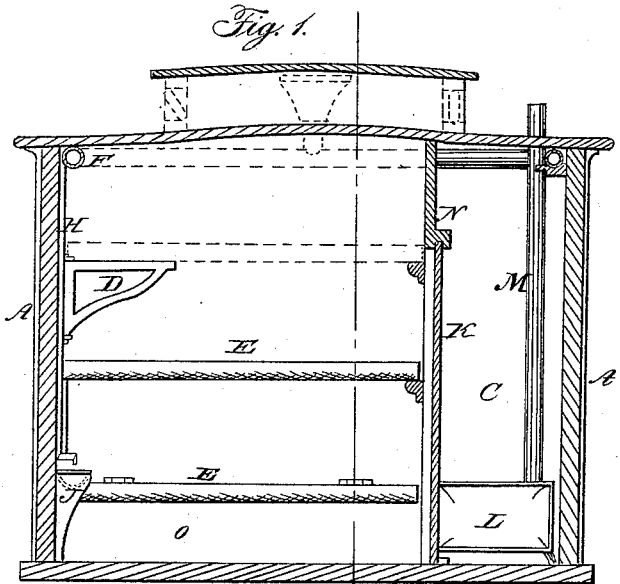
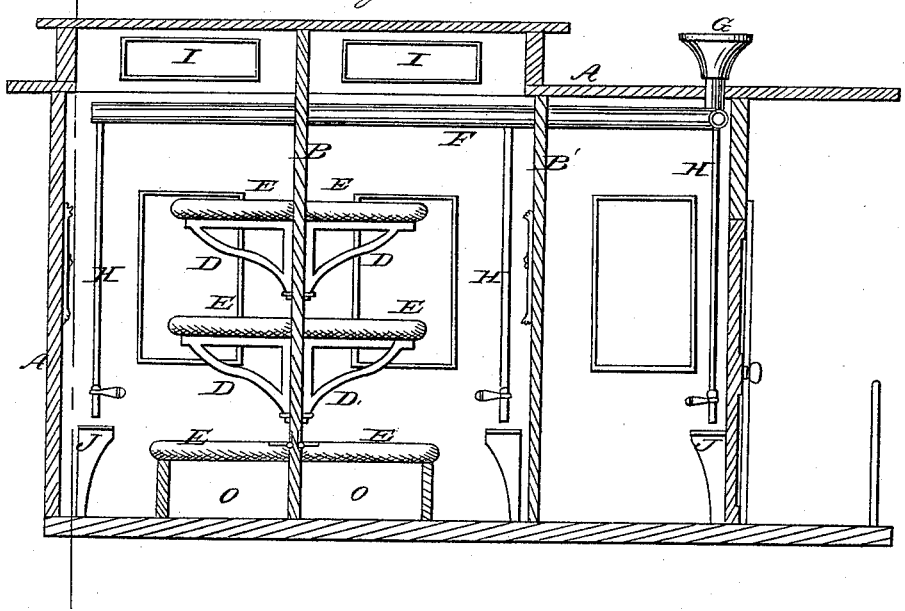
Witnesses:
Inventor:

United States Patent Office.

JOHN SWAN, OF BALTIMORE, MARYLAND.

Letters Patent No. 65,963, dated June 18, 1867.

IMPROVEMENT IN SLEEPING-CARS.

*The Schedule referred to in these Letters Patent and making part of the same.*

TO ALL WHOM IT MAY CONCERN:

Be it known that I, JOHN SWAN, of Baltimore, in the county of Baltimore, and in the State of Maryland, have invented certain new and useful Improvements in Sleeping-Cars, and do hereby declare that the following is a full, clear, and exact description thereof, reference being had to the accompanying drawings, and to the letters of reference marked thereon.

In the annexed drawings, making part of this specification, A represents a car-body, which may be made in any of the known and usual ways and supported upon the ordinary trucks. This car-body is provided with a partition, which runs longitudinally of it from near one end to near the other, being placed so as to make or form an aisle or passage-way between it and one side of the car-body. A series of partitions, B, runs crosswise of the body, from the partition N to the other side of said body, being about six feet six inches in length, thus forming a series of state-rooms, which are entered from the passage-way C through the door-ways of the sliding-doors K. The door-ways are formed in the partition N, and are provided with sliding-doors K so as not to obstruct the passage-way. Each state-room is made about forty-two inches in width, and within each of said rooms are placed three beds, at suitable distances, one above the other. These beds are made twenty-eight inches wide, leaving a space between its outer edge and the partition next to it of fourteen inches. The lower bed is hinged upon and forms the cover to a box, O. During the day-time, when the second and third beds are not in use, they are removed from their supports and placed under the lower bed, within the box O. D D represent hinged brackets, which support the two upper beds. These brackets can be swung around so that they will lie against the cross-partitions when the beds are not being used. F represents a reservoir or pipe, which runs around the top of the car on its inside, which is intended for holding water. This pipe is made large enough to contain about nine gallons of water for each state-room, and is provided with a funnel, as seen at G, through which it may be supplied with water at any of the usual tanks. A pipe, H, which is provided with a stop-cock, passes down from reservoir F into each state-room, and supplies water to the basins J J. L represents a stove, and M its pipe, said stove being placed in the passage-way for the purpose of warming the car in cold weather. A water-closet or privy may be made at each end of the car, one for the accommodation of ladies and the other for gentlemen. Each state-room has its ventilating window, I, and each its looking-glass. One great advantage in arranging a sleeping-car in this manner is that each state-room is separate and distinct, having its own door, to be opened at pleasure, and having its own ventilation. A party of gentlemen occupying one of these rooms can smoke or drink their wine or eat their meats without inconveniencing or annoying others, and with perfect privacy. Another advantage is, water is supplied to each room, so that its occupants can perform their ablutions in the morning or be supplied with water, when necessary, during the day, without the great inconvenience of staggering from their seats to the end of the car to find a water-tank or cooler, Another advantage is that the beds being placed crosswise of the body of the car, the occupants are not rolled about or jostled by the sidewise movement so incident or common in cars in passing around curves or over small obstructions upon the track, and are thus enabled to rest with more ease and comfort. Two state-rooms may be sometimes formed in one to accommodate families. Sleeping-cars may be made cheaper by my plan than they can be by the modes now usually adopted.

Having thus described my invention, what I claim as new, and desire to secure by Letters Patent, is—

In a railway car, of a series of state-rooms provided with side passage and independent ventilation, the combination and arrangement of a reservoir, F, pipes H H, and basins G, in the state-rooms, as and for the purpose specified.

In testimony that I claim the foregoing I have hereunto set my hand this 6th day of April, 1867.

JNO. SWAN.

Witnesses:
WM. H. BROWNELL,
C. M. ALEXANDER.